(12) United States Patent
Park (10) Patent No.: US 9,979,790 B1
(45) Date of Patent: May 22, 2018

(54) LONG TERM EVOLUTION COMMUNICATION NETWORK TO ROUTE VEHICLE-TO-X (V2X) DATA COMMUNICATIONS

(71) Applicant: Sprint Communications Company L.P., Overland Park, KS (US)

(72) Inventor: Sunyong Park, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 15/223,700

(22) Filed: Jul. 29, 2016

(51) Int. Cl.
  *H04W 76/02* (2009.01)
  *H04L 29/08* (2006.01)
  *H04W 76/04* (2009.01)
  *H04W 84/00* (2009.01)

(52) U.S. Cl.
  CPC .............. *H04L 67/12* (2013.01); *H04L 67/16* (2013.01); *H04W 76/02* (2013.01); *H04W 76/045* (2013.01); *H04W 84/005* (2013.01)

(58) Field of Classification Search
  CPC . H04W 76/022; H04W 76/021; H04W 72/04; H04W 72/042; H04W 72/0406
  See application file for complete search history.

(56) References Cited

U.S. PATENT DOCUMENTS

| 9,232,547 | B2 | 1/2016 | Mishra et al. |
| 2013/0195005 | A1 | 8/2013 | Al-Shalash |
| 2015/0282210 | A1 | 10/2015 | Li et al. |
| 2017/0006140 | A1* | 1/2017 | Park .................. H04L 45/66 |
| 2017/0006586 | A1* | 1/2017 | Gulati ............... H04W 72/0453 |
| 2017/0006622 | A1* | 1/2017 | Baghel ................. H04W 28/06 |
| 2017/0021764 | A1* | 1/2017 | Adams .................. B60Q 9/00 |

FOREIGN PATENT DOCUMENTS

WO     2015144226     10/2015

OTHER PUBLICATIONS

"5G Automotive Vision;" Oct. 20, 2015; pp. 1-67; Europe.

* cited by examiner

*Primary Examiner* — Jamal Javaid (57) ABSTRACT

A Long Term Evolution (LTE) data communication network to route Vehicle-to-X (V2X) data communications. The LTE communication network includes an LTE network central core and distributed LTE network cores individually connected to LTE network agents. The LTE communication network further includes a wireless base station receiving V2X service data individually associating the distributed LTE network cores and the LTE network agents with multiple V2X service types; and receiving user communication data identifying one of the V2X service types from the vehicle UE. If the identified V2X service type is associated with one of the LTE network agents, then the wireless base station transfers the user communication data to the associated distributed LTE network core for delivery to the associated one of the LTE network agents. If the identified V2X service type is not associated with one of the LTE network agents, then the wireless base station transfers the user communication data to the LTE network central core.

16 Claims, 7 Drawing Sheets

LONG TERM EVOLUTION COMMUNICATION NETWORK TO ROUTE VEHICLE-TO-X (V2X) DATA COMMUNICATIONS

TECHNICAL BACKGROUND

Data communications exchange user data with vehicle User Equipment (V-UEs) to provide various data communication services. The V-UEs may be motor vehicles equipped to communicate over wireless communication networks, such as Long Term Evolution (LTE) communication networks. The data communication services may be Internet access, audio/video streaming, voice/video calling, messaging, evolved Multimedia Broadcast Multicast Service (eMBMS), location-based services, local bulletins (news/traffic/weather), vehicle services (V2X), group communications, enterprise access, or some other computerized information service.

A popular wireless communication protocol is LTE. LTE networks use wireless base stations called evolved Node Bs (eNodeBs) to connect LTE-enabled devices to LTE network cores. The LTE network cores comprise network elements like mobility managers, gateways, controllers, routers, databases, and servers. The LTE network cores exchange user data with the communication devices over the eNodeBs to provide various data services. The communication devices typically attach to a proximate LTE network core, and may switch from one LTE network core to another when the device travels over large distances.

OVERVIEW

Examples disclosed herein provide a system, method, hardware, and software to route Vehicle-to-X (V2X) data communications in a Long Term Evolution (LTE) data communication network. The method includes an LTE network central core and a plurality of distributed LTE network cores individually connected to a plurality of LTE network agents. The method further includes a wireless base station receiving V2X service data individually associating the distributed LTE network cores and the LTE network agents with multiple V2X service types; and receiving user communication data identifying one of the V2X service types from a vehicle UE. If the identified V2X service type is associated with one of the LTE network agents, then the method includes transferring the user communication data for delivery to the associated distributed LTE network core for delivery to the associated one of the LTE network agents. If the identified V2X service type is not associated with one of the LTE network agents, then the method includes transferring the user communication data for delivery to the LTE network central core.

In another example, an LTE communication network routes V2X data communications. The LTE communication network includes an LTE network central core and a plurality of distributed LTE network cores individually connected to a plurality of LTE network agents. The LTE communication network further includes a wireless base station configured to receive V2X service data individually associating the distributed LTE network cores and the LTE network agents with multiple V2X service types; and receive user communication data identifying one of the V2X service types from a vehicle UE. If the identified V2X service type is associated with one of the LTE network agents, then the wireless base station is configured to transfer the user communication data for delivery to the associated distributed LTE network core for delivery to the associated one of the LTE network agents. If the identified V2X service type is not associated with one of the LTE network agents, then wireless base station is configured to transfer the user communication data for delivery to the LTE network central core.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
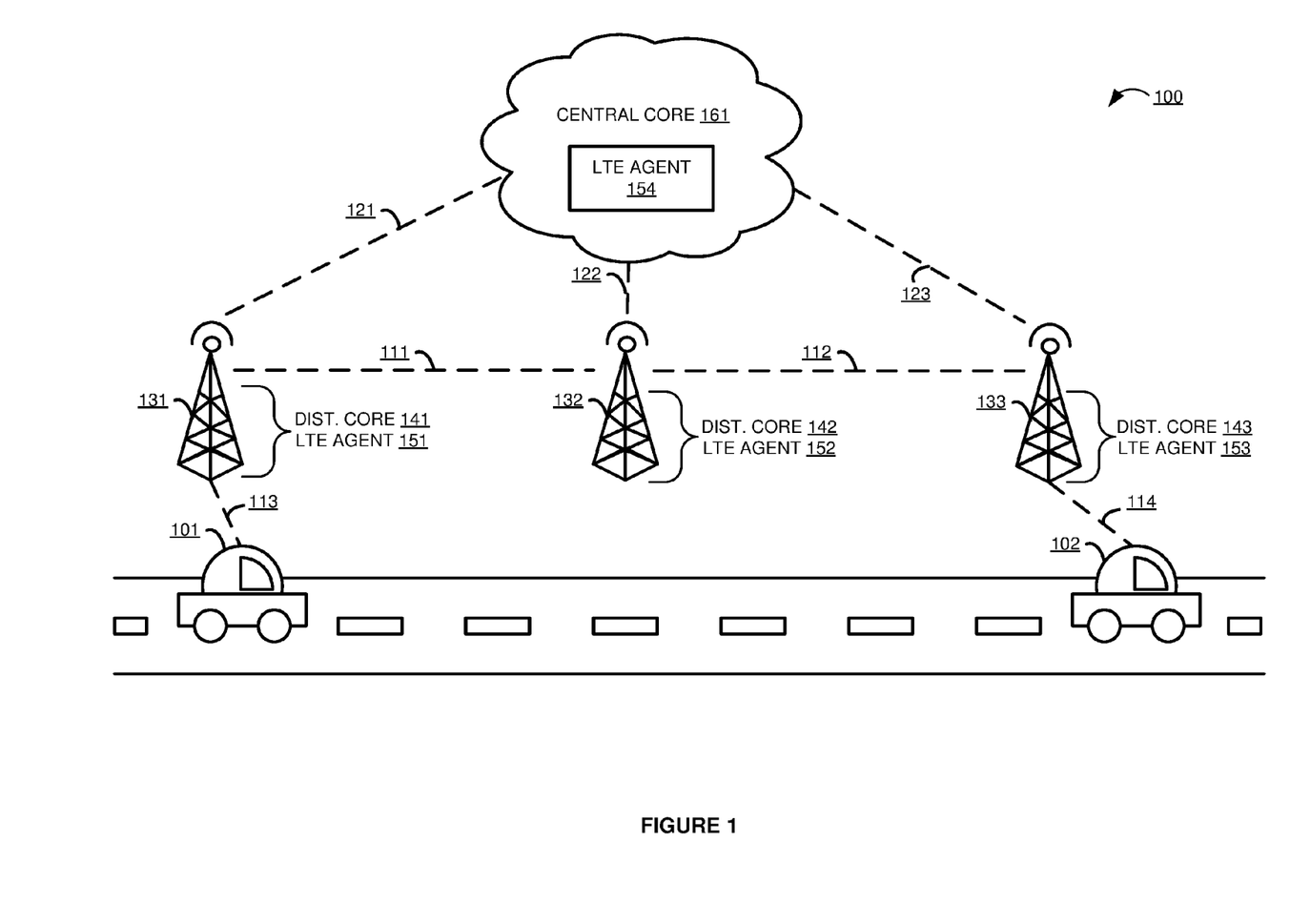
FIG. 1 illustrates a Long Term Evolution (LTE) communication network to route Vehicle-to-X (V2X) data communications.

FIG. 1 illustrates Long Term Evolution (LTE) communication network 100 to route Vehicle-to-X (V2X) data communications. LTE communication network 100 includes vehicle User Equipment (V-UEs) 101-102, wireless base stations 131-133, central core 161, and communication links 111-114 and 121-123. Wireless base stations 131-133 include distributed LTE network cores 141-143 and LTE network agents 151-153, respectively. Wireless base stations 131-133 may include more or fewer LTE network agents.

Distributed LTE network cores 141-143 comprise communication network elements like gateways, controllers, routers, database, servers, processing circuitry, memory, communication transceivers, and operating software. In some examples, distributed LTE network cores 141-143 and LTE network agents 151-153 are implemented using Network Function Virtualization (NFV). Central core 161 includes LTE network agent 154. Central core 161 may include other elements, such as gateways, routers, databases, mobility managers, and/or other elements omitted for clarity.

Wireless base stations 131-133 communicate with central core 161 over communication links 121-123, respectively. V-UE 101 communicates with wireless base station 131 over wireless communication link 113. V-UE 102 communicates with wireless base station 133 over wireless communication link 114. Wireless base stations 131 and 132 communicate over communication link 111. Wireless base stations 132 and 133 communicate over communication link 112. In some examples communication links 111-112 comprise an X2 link.

Communication links 111-114 and 121-123 may use any of a variety of communication media, such as air, metal, optical fiber, or any other signal propagation path, including combinations thereof. Also, the links may use any of a variety of communication protocols, such as Internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In some examples, central core 161 comprises an adjacent LTE core of the LTE communication network. Examples of wireless base stations 131-133 include evolved Node Bs (eNodeBs), Wireless Fidelity (WIFI) hotspots, LTE relays, 5G base stations, or other wireless access points. Examples of V-UEs 101-102 include motor vehicles that are LTE-enabled.

Although not shown, other User Equipment (UEs) such as a telephone, cellular phone, mobile phone, smartphone, Personal Digital Assistant (PDA), laptop, computer, e-book, eReader, mobile Internet appliance, or some other wireless communication device with a wireless transceiver—may be used to transmit user communication data. Examples of user communication data include Internet access, audio/video streaming, voice/video calling, messaging, evolved Multimedia Broadcast Multicast Service (eMBMS), location-based services, local bulletins (news, traffic, weather), group communications, enterprise access, fleet monitoring, or some other computerized information services.

In operation, distributed LTE network cores 141-143 are individually connected to LTE network agents 151-153, respectively. Wireless base stations 131-133 receive V2X service data individually associating distributed LTE network cores 141-143 and LTE network agents 151-153 with multiple V2X service types. Examples of V2X service types includes Vehicle-to-Vehicle (V2V), Vehicle-to-Pedestrian (V2P), Vehicle-to-Network (V2N), Vehicle-to-Infrastructure (V2I), or some other Vehicle-to-X (V2X) service. Wireless base stations 131-133 receive user communication data identifying one of the V2X service types from V-UEs 101-102.

If the identified V2X service type is associated with one of LTE network agents 151-153, then wireless base stations 131-133 transfer the user communication data for delivery to associated distributed LTE network core 131-133 for delivery to the associated one of the LTE network agents 151-153.

If the identified V2X service type is not associated with one of the LTE network agents 151-153, then wireless base stations 131-133 transfer the user communication data for delivery to the LTE network central core 161 for delivery to LTE network agent 154. In some examples, the functions of LTE network agent 154 may be incorporated into other elements of central core 161, and LTE network agent 154 may be omitted.

Figure 2:
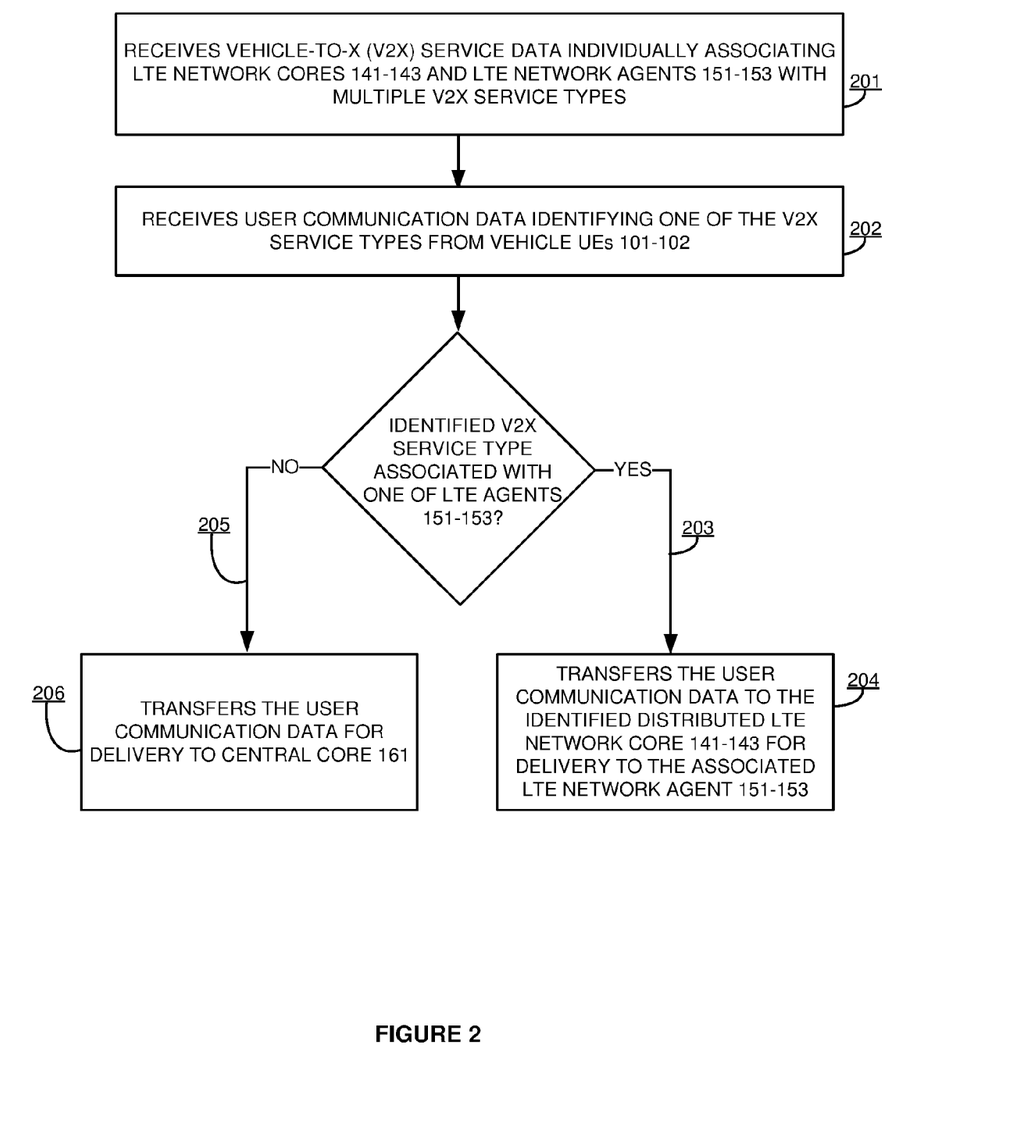
FIG. 2 illustrates the operation of the LTE communication network to route V2X data communications.

FIG. 2 illustrates the operation of LTE communication network 100 to route V2X data communications. Wireless base stations 131-133 receive V2X service data individually associating distributed LTE network cores 141-143 and LTE network agents 151-153 with multiple V2X service types (201). In some examples, the V2X service data is transmitted to wireless base stations 131-133 in an S1 Application Protocol (S1AP) message.

Although not required, wireless base stations 131-133 may aggregate and correlate the received V2X service data into a data structure that individually associates each LTE network agent with one or more V2X services types. In some examples, each LTE network agent 151-153 handles one V2X service. In other examples, each LTE network agent 151-154 may handle multiple V2X services.

In some examples, LTE network cores 141-143 and 161 may comprise Network Function Virtualization Infrastructures (NFVIs) that execute Network Function Virtualization (NFV) Virtual Network Functions (VNFs). These NFV VNFs may comprise Software-Defined Network (SDN) applications and controllers. In turn, the NFV VNFs and SDN applications may comprise base station controllers, MMEs, S-GWs, P-GWs, HSS, PCRF, V2X servers, eMBMS servers, group communication servers, local bulletin servers, and enterprise servers.

Wireless base stations 131-133 receive user communication data identifying one of the V2X service types from V-UEs 101-102 (202). In some examples, wireless base stations 131-133 indicate available V2X service types to V-UEs 101-102. V2X service types may be indicated in the System Information Blocks (SIBs). V-UEs 101-102 may transfer user communication data directly to the wireless base station containing the LTE network agent associated with the requested V2X service. In other examples, V-UEs 101-102 transfer the user communication data to the servicing wireless base station without knowledge of the available V2X services, and the wireless base station forwards the user communication data to the appropriate LTE network agent. The user communication data may be a Radio Resource Connect (RRC) message with a Service Feature Indicator (SFI) that indicates the V2X service type. If an RRC message is used, the message may also include the standard establishment clause in addition to the SFI.

If the identified V2X service type is associated with one of LTE network agents 151-153 (203), then wireless base stations 131-133 transfer the user communication data for delivery to the associated distributed LTE network core 131-133 for delivery to the associated one of the LTE network agents 151-153 (204). If the identified V2X service type is not associated with one of the LTE network agents 151-153 (205), then wireless base stations 131-133 transfer the user communication data for delivery to the LTE network central core 161 for delivery to LTE network agent 154 (206). In some examples, wireless base stations 131-133 perform a look-up in the V2X service type database to determine the associated distributed LTE network core/LTE network agent.

Figure 3:
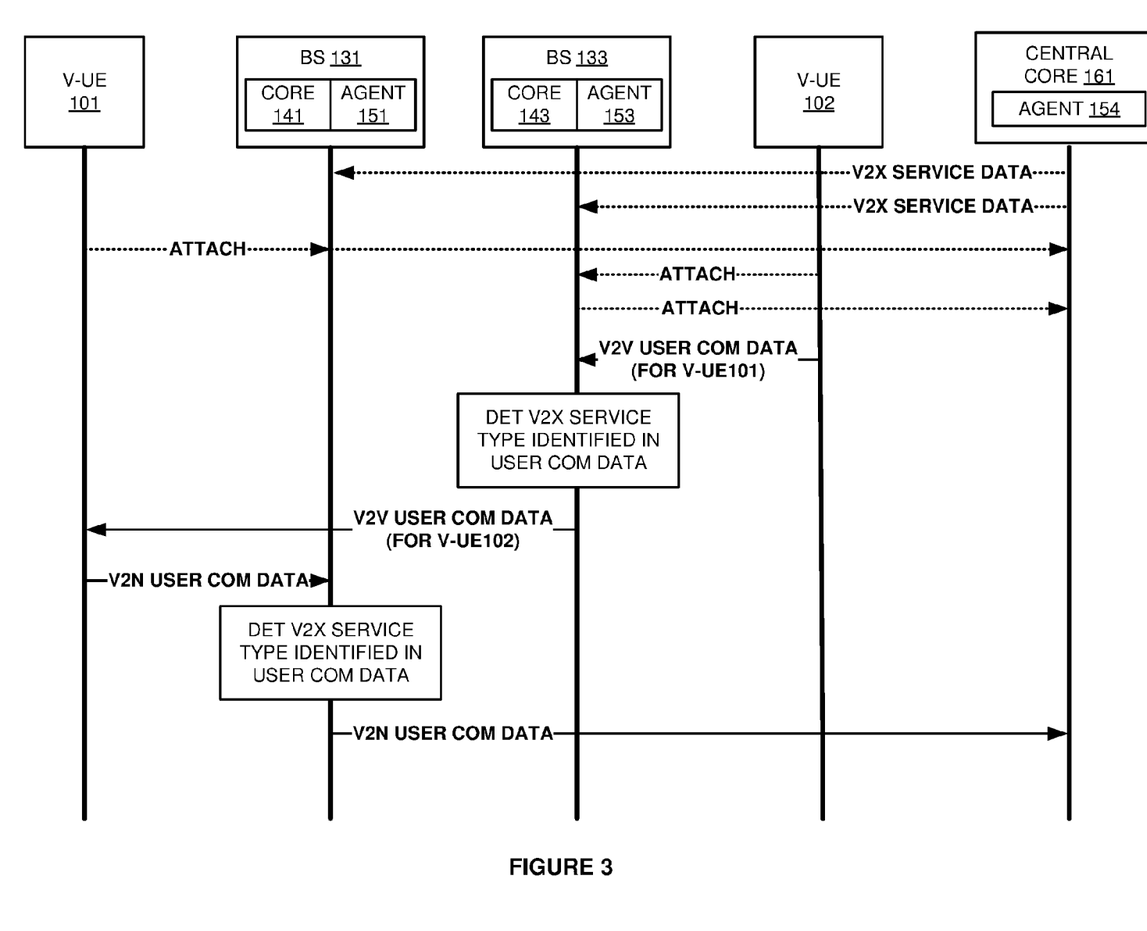
FIG. 3 illustrates the operation of the LTE communication network to route V2X data communications.

FIG. 3 illustrates the operation of LTE communication network 100 to route V2X data communications. V-UE 101 attaches to wireless base station (BS) 131. Wireless base station 131 forwards the attach request to central core 161.

V-UE 102 attaches to wireless base station 132. Wireless base station 133 forwards the attach request to central core 161. In some examples, wireless base stations 131-133 may be configured to perform the registration, authentication, and/or authorization process for V-UEs 101-102.

Wireless base stations 131-133 receive V2X service data individually associating LTE network agents 151-153 with multiple V2X service types (wireless base station 132 has been omitted for clarity). For example, LTE network agent 151 in wireless base station 131 may be configured to handle V2V and V2P data communications and wireless base station 133 may be configured to handle V2V data communications.

V-UE 102 transmits user communication data to wireless base station 133. For example, the user data communication could comprise data related to a traffic accident, which may be useful to other cars traveling on the same route. The user communication data containing information about the traffic accident would be identified with a V2V service type, as the data would be useful and should be transmitted to other cars traveling the same route. Wireless base station 133 determines that the V2V service type is identified in the user communication data and determines whether any of the LTE agents 151-153 are associated with the identified V2V service type.

In this example, LTE network agent 151 in wireless base station 131 is associated with the V2V service type. Wireless base station 133 transfers the user communication data for delivery to wireless base station 131. In some examples, user communication data may be delivered directly to distributed LTE network core 141 for delivery to LTE network agent 151. LTE network agent 151 determines the user communication data should be transferred for delivery to V-UE 101. Although not shown, LTE network agent 132 in wireless base station 132 may also be associated with the V2V service type, and the user communication data is also transferred for delivery to LTE agent 152. Advantageously, wireless base stations 131-133 are able to more efficiently route user communication data, without having to transmit all user communication back to central LTE network core 161.

In another example, V-UE 101 transfers user communication data to wireless base station 131. For example, the user communication data could comprise a request for a voice call, which has a V2X service type of V2N. None of LTE network agents 151-153 are associated with a V2N service type, therefore, wireless base station 131 transfers the user communication data for delivery to central core 161/LTE network agent 154.

Figure 4:
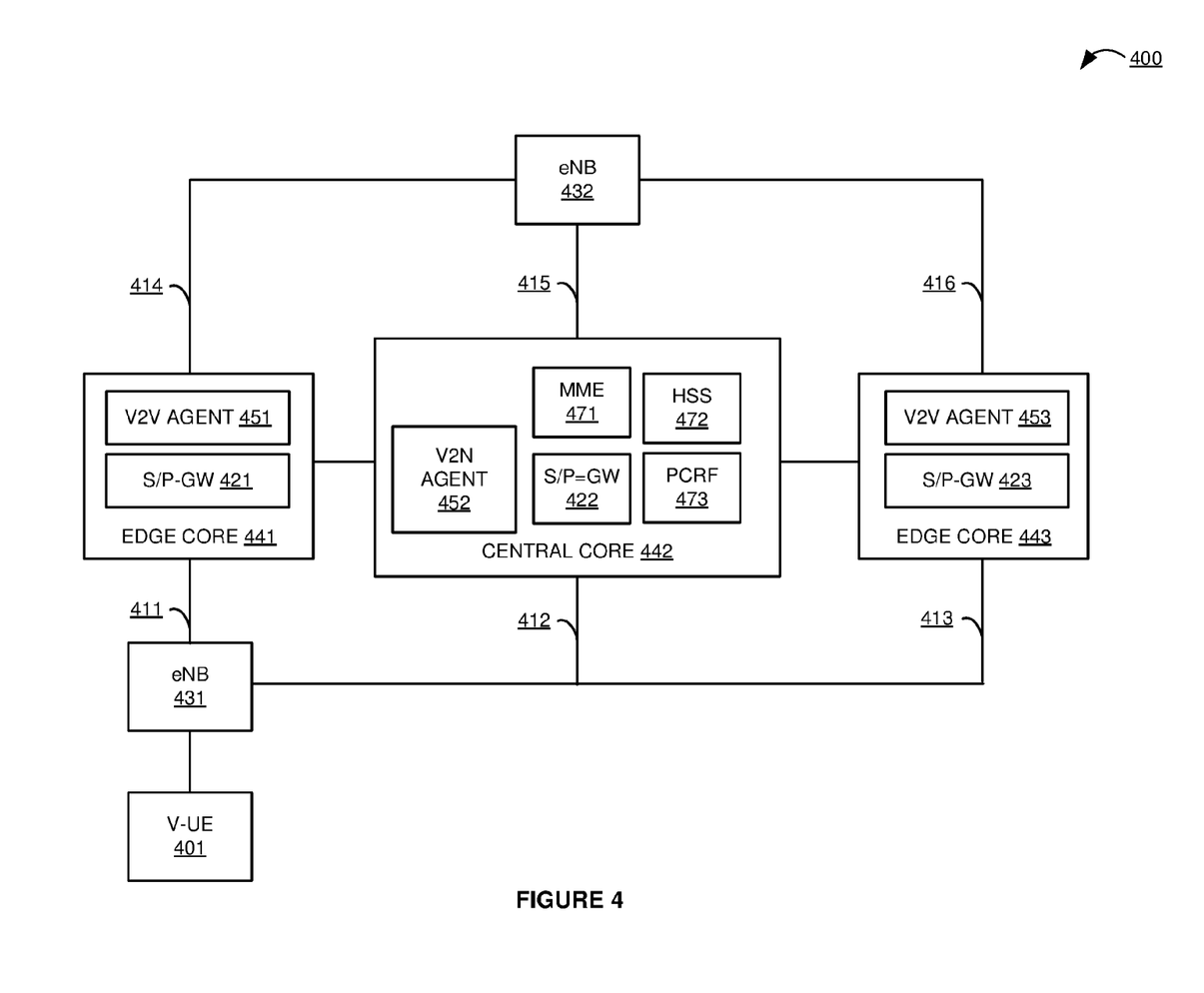
FIG. 4 illustrates an LTE communication network to route V2X data communications.

FIG. 4 illustrates the operation of LTE communication network 400 to route V2X data communications. LTE communication network 400 includes V-UE 401, eNodeB 431, eNodeB 432, edge cores 441 and 443, and central core 442. Edge core 441 includes S/P-GW 421 and V2V LTE network agent 451. Edge core 443 includes S/P-GW 423 and V2P LTE network agent 453. Central core 442 includes S/P-GW 422, V2N LTE network agent 452, MME 471, HSS 472, and PCRF 473.

ENodeB 431 is connected to edge core 441 through S/P-GW 421 over communication link 411. ENodeB 431 is connected to central core 442 through S/P-GW 422 over communication link 412. ENodeB 431 is connected to edge core 443 through S/P-GW 423 over communication link 413. ENodeB 432 is connected to edge core 441 through S/P-GW 421 over communication link 414. ENodeB 432 is connected to central core 442 through S/P-GW 422 over communication link 415. ENodeB 432 is connected to edge core 443 through S/P-GW 423 over communication link 416.

In operation, when V-UE 401 enters the coverage area of eNodeB 431, V-UE 401 sends an initial UE message/attach request to eNodeB 431. ENodeB 431 transfers the attach request to MME 471. MME 471 transfers an update location request to HSS 473. HSS 473 returns an update location answer. MME 471 transfers a create session request to the S-GW. The S-GW sends a create session request to the P-GW. The P-GW responds to the S-GW with a create session response. The S-GW responds to the MME with a create session response.

In some examples, upon receiving an attach request from V-UE 401, MME establishes communication links/IP tunnels 411-413 between eNodeB 431 and LTE cores 441-443. Each IP tunnel 411-413 has a different IP address. Rather than transferring the multiple IP addresses to V-UE 401, eNodeB 431 individually associates edge core 441 with V2V LTE network agent 451, central core 442 with V2N LTE network agent 452, and edge core 443 with V2P LTE network agent 453; and transfers a single IP address to V-UE 401 to be used for all V2X services. Advantageously, rather than having multiple APNs/IP addresses, a single IP address/APN may be used for all V2X services. V-UE addresses all V2X service requests to a single IP address and eNodeB 431 routes the V2X service requests based on the V2X service type identified in the request/message.

In other examples, communication links/IP tunnels 411-416 are previously established and maintained. Advantageously, when eNodeB 431 receives user communication data, eNodeB 431 can transfer the user communication data over an established IP tunnel, which decreases setup time and improves the quality of service. Decreasing setup time may provide more efficient service when the user is traveling in a fast car with frequent handoffs. Furthermore, if V-UE 401 performs a handoff or handover to eNodeB 432, eNodeB 432 can used its established IP tunnels 414-416 to route the user communication data.

ENodeB 431 receives user communication data identifying one of the V2X service types from V-UE 401. For example, V-UE 401 transfers a user request for a voice call. Voice calls are handled by central core 442, and the user request is identified with a service type of V2N, eNodeB 431 transfers the user request for a voice call to central core 442 over communication link 412.

In another example, V-UE 401 transfers a request for traffic information. The request is identified as a V2V service type, eNodeB 431 determines that LTE network agent 451 is associated with the V2V service type. ENodeB 431 transfers the user request for traffic information to S/P-GW 421 for delivery to edge core 441. LTE network agent 451 handles the user request for traffic information.

In some examples, LTE network agent 451 may query other LTE agents for traffic information. For example, LTE network agent 451 may transfer a request to another LTE network agent, which then queries attached V-UEs. The V-UEs report the requested traffic information. LTE network agent may determine that there is heavy traffic on the current route based on the velocity of the reporting V-UEs.

The core layer has edge cores, mid cores, and central cores. The edge cores are usually smaller and may be deployed along roads or in special purpose locations. The edge cores manage services like Internet access (INET), V2X, local bulletin, and group communications. The mid cores are larger than edge cores and are typically near suburbs, campuses, and large enterprises. The mid cores manage services like INET, Short Messaging Service (SMS), Multimedia Messaging Service (MMS), eMBMS, Location-Based Services (LBS). The central cores are larger than mid cores and are typically in dense urban areas. The central cores manage all services including INET, voice/video conferencing, enterprise services, V2X, local bulletin, group communications, SMS/MMS, eMBMS, and LBS. Many LTE network cores comprise NFVIs that execute NFV VNFs. These NFV VNFs comprise SDN applications and controllers. In turn, the SDN application VNFs comprise base-band units, base station controllers, MMEs, S-GWs, P-GWs, HSS, PCRF, V2X servers, eMBMS servers, group communication servers, local bulletin servers, enterprise servers, and the like.

LTE network cores may vary. Some LTE network cores may have different network elements. Some LTE network cores may have multiple Mobility Management Entities (MMEs) that share a Serving Gateway (S-GW) and a Packet Data Network Gateway (P-GW). Other LTE network cores may have multiple MMEs and S-GWs and share a P-GW. Some LTE network cores may have direct access to a Home Subscriber System (HSS) and/or Policy Charging Rules Function (PCRF), while other LTE network cores have indirect access through another core. Some LTE network cores may have direct Internet access or indirect Internet access through another core.

Figure 5:
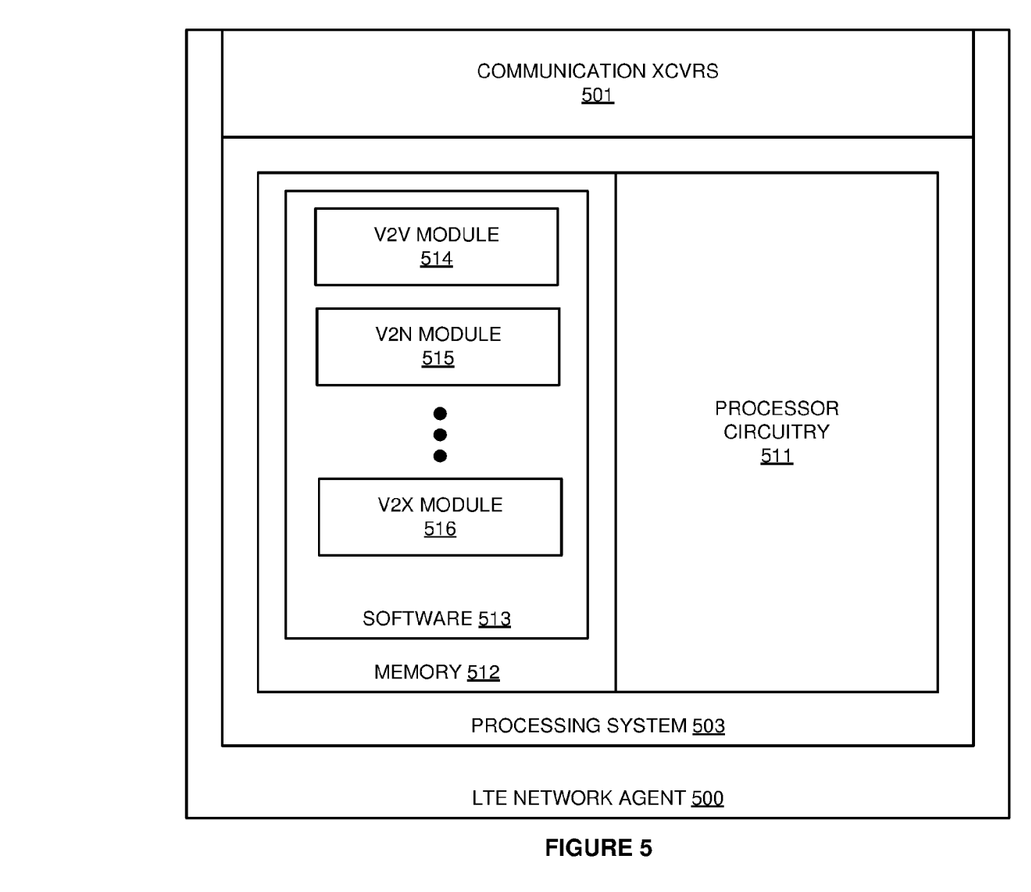
FIG. 5 illustrates an example of a distributed LTE network agent.

FIG. 5 illustrates LTE network agent 500. LTE network agent 500 is an example of LTE network agents 151-154 and 451-453, although LTE network agents 151-154 and 451-453 may use alternative configurations. LTE network agent 500 comprises communication transceiver system 501 and processing system 503. Processing system 503 includes processing circuitry 511 and memory 512 that stores operating software 513. LTE network agent 500 may be implementing using NFV.

Communication transceiver system 501 comprises components that communicate over communication links, such as network cards, ports, RF transceivers, processing circuitry and software, or some other communication devices. Communication transceiver system 501 may be configured to communicate over metallic, wireless, or optical links. Communication transceiver system 501 may be configured to use TDM, IP, Ethernet, optical networking, wireless protocols, communication signaling, or some other communication format—including combinations thereof.

Processing circuitry 503 comprises microprocessor and other circuitry that retrieves and executes operating software 513 from memory 512. Memory 512 comprises a non-transitory storage medium, such as a disk drive, flash drive, data storage circuitry, or some other memory apparatus. Operating software 513 comprises computer programs, firmware, or some other form of machine-readable processing instructions. Operating software 513 may include an operating system, utilities, drivers, network interfaces, applications, or some other type of software. When executed by circuitry 511, operating software 513 directs processing system 503 to operate LTE network agent 500 as described herein. In particular, V2V module 514, V2N module 515, and V2X module 516 directs processing system 503 to provide the V2X services.

Figure 6:
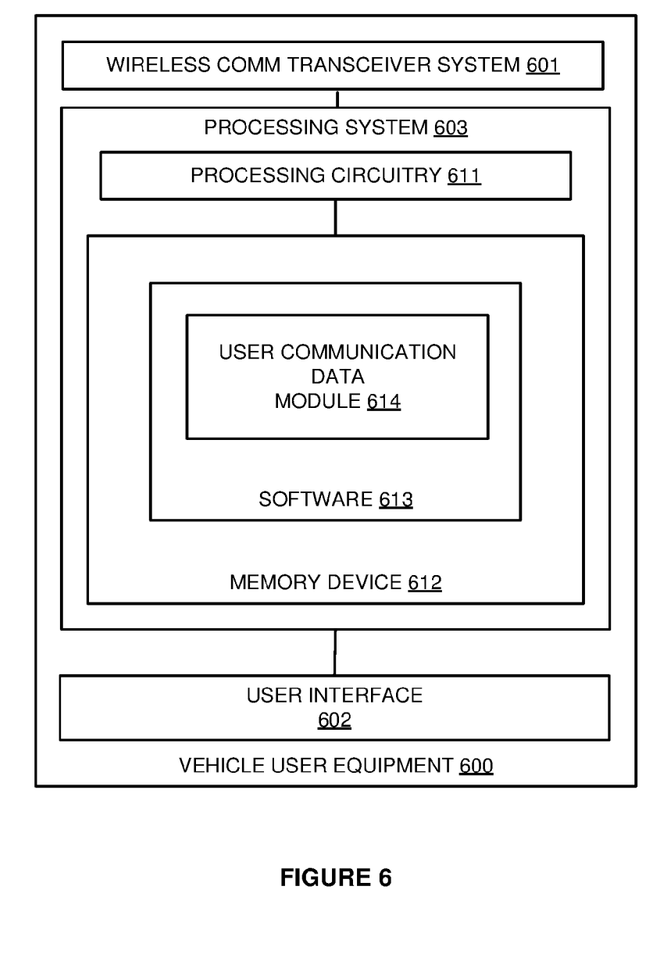
FIG. 6 illustrates an example of a vehicle User Equipment.

FIG. 6 illustrates vehicle User Equipment (V-UE) 000. V-UE 600 is an example of V-UEs 101-102 and 401, although V-UEs 101-102 and 401 could use alternative configurations. V-UE 600 comprises wireless communication transceiver system 601, user interface 602, and processing system 603. Processing system 603 is linked to wireless communication interface 601 and user interface 602. Processing system 603 includes processing circuitry 611 and memory device 612 that stores software 613. V-UE 600 may include other well-known components such as a battery and enclosure that are not shown for clarity. V-UE 600 may be an LTE-enable motor vehicle, telephone, computer, e-book, mobile Internet appliance, media player, game console, wireless network interface card, or some other wireless communication apparatus—including combinations thereof.

Wireless communication transceiver system 601 comprises RF communication circuitry and an antenna. The RF communication circuitry typically includes an amplifier, filter, RF modulator, and signal processing circuitry. Wireless communication transceiver system 601 may also include a memory device, software, processing circuitry, or some other communication device. Wireless communication transceiver system 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 611 comprises microprocessor and other circuitry that retrieves and executes software 613 from memory device 612. Memory device 612 comprises a non-transitory storage medium, such as a disk drive, flash drive, data storage circuitry, or some other memory apparatus. Processing circuitry 611 is typically mounted on a circuit board that may also hold memory device 612 and portions of communication transceiver system 601 and user interface 602. Software 613 comprises computer programs, firmware, or some other form of machine-readable processing instructions. Software 613 may include an operating system, utilities, drivers, network interfaces, applications, or some other type of software. When executed by processing circuitry 611, software 613 directs processing system 603 to operate V-UE 600 as described herein. In particular, user communication data module directs processing system 603 to transfer user communication data for delivery to a wireless base station.

Figure 7:
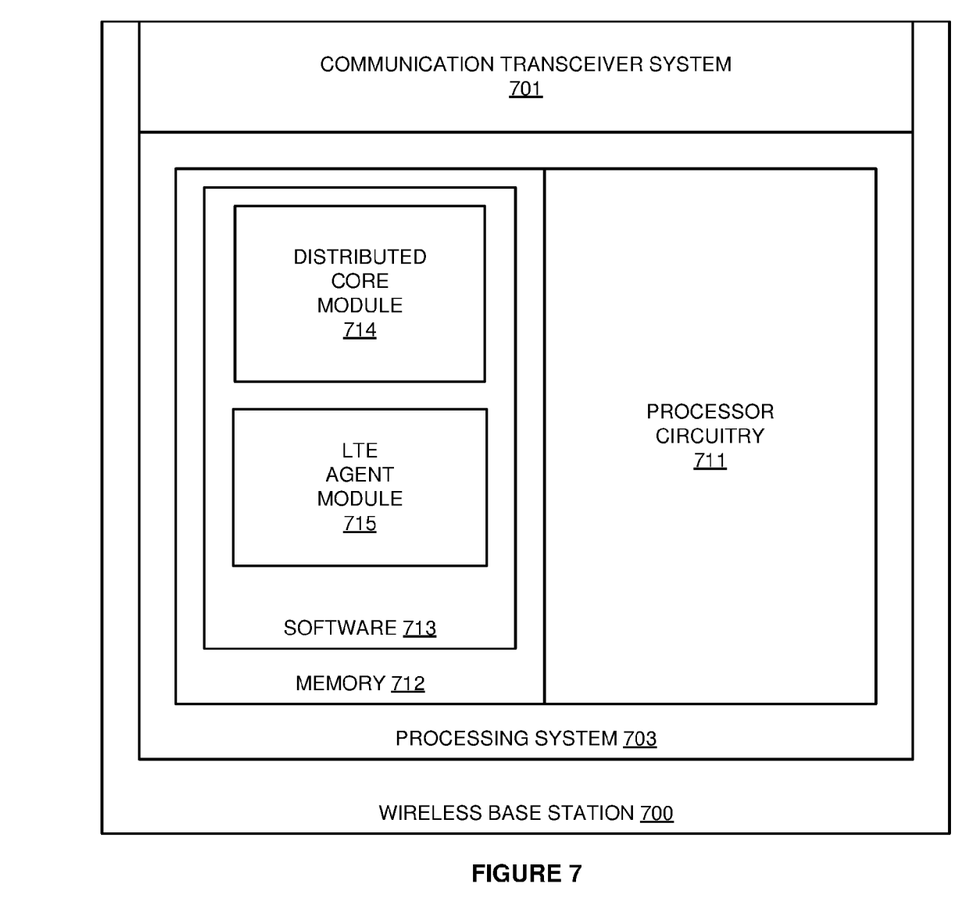
FIG. 7 illustrates an example of a wireless base station.

FIG. 7 illustrates wireless base station 700 to route V2X data communications. Wireless base station 700 is an example of wireless base stations 131-133 and eNodeB 431, although wireless base stations 131-133 and eNodeB 431 could use alternative configurations and operations. Wireless base station 700 comprises communication transceiver system 701 and processing system 703. Processing system 703 includes processor circuitry 711 and memory 712 that stores software 713. Software 713 comprises software modules 714-715.

Communication transceiver system 701 comprises components that communicate over communication links such as network cards, ports, RF transceivers, processing circuitry and software, or some other communication components. Communication transceiver system 701 may be configured to communicate over metallic, wireless, or optical links. Communication transceiver system 701 may be configured to use TDM, IP, Ethernet, optical networking, wireless protocols, communication signaling, or some other communication format—including combinations thereof. Communication transceiver system 701 may receive V2X service data and receive and transfer user communication data.

Communication transceiver system 701 may also be configured to communicate using wireless communication protocols such as LTE.

Processor circuitry 711 comprises microprocessor and other circuitry that retrieves and executes operating software 713 from memory 712. Processor circuitry 711 may comprise a single device or could be distributed across multiple devices—including devices in different geographic areas. Processor circuitry 711 may be embedded in various types of equipment. Examples of processor circuitry 711 include central processing units, application-specific processors, logic devices, and/or any type of computer processing devices—including combinations thereof.

Memory 712 comprises a non-transitory computer readable storage medium readable by processing system 703 and capable of storing software 713, such as a disk drive, flash drive, data storage circuitry, or some other hardware memory apparatus—including combinations thereof. Memory 712 can include non-transitory, volatile and non-volatile, removable and non-removable media implemented in any method or technology for storage of information, such as computer readable instructions, data structures, program modules, or other data—including combinations thereof. Memory 712 may comprise a single device or could be distributed across multiple devices—including devices in different geographic areas. Memory 712 may be embedded in various types of equipment. In some examples, a computer apparatus could comprise memory 712 and software 713.

Software 713 comprises computer programs, firmware, or some other form of machine-readable processing instructions. Software 713 may include an operating system, utilities, drivers, network interfaces, applications, or some other type of software. In this example, software 713 comprises distributed core module 714 and LTE agent module 715. Although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to route V2X data communications. In particular, distributed core module 714 directs processing system 703 to implement functions of a distributed network core. LTE network agent module 715 directs processing system 703 to perform the V2X services.

Referring back to FIG. 1, V-UEs 101-102 comprise Radio Frequency (RF) communication circuitry and an antenna. The RF communication circuitry typically includes an amplifier, filter, modulator, and signal processing circuitry. V-UEs 101-102 may also include a user interface, memory device, software, processing circuitry, or some other communication components. V-UEs 101-102 may be an LTE-enable motor vehicle, telephone, computer, e-book, mobile Internet appliance, wireless network interface card, media player, game console, or some other wireless communication apparatus—including combinations thereof.

Wireless base stations 131-133 comprises RF communication circuitry and an antenna. The RF communication circuitry typically includes an amplifier, filter, RF modulator, and signal processing circuitry. Wireless base stations 131-133 may also include a router, server, memory device, software, processing circuitry, cabling, power supply, network communication interface, structural support, or some other communication apparatus. Wireless base stations 131-133 could be an eNodeB, base station, Internet access node, WIFI hotspot, telephony service node, wireless data access point, or some other wireless communication system—including combinations thereof.

Wireless communication links 113-114 use the air or space as the transport media. Wireless communication links 113-114 may use a wireless protocol such as Long Term Evolution (LTE) or Wireless Fidelity (WIFI). Communication links 111-112 and 121-123 use metal, glass, air, space, or some other material as the transport media. Communication links 111-112 and 121-123 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 and 121-123 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless base station in a Long Term Evolution (LTE) network that comprises an LTE network core hosting a core Vehicle-to-X (V2X) agent and the wireless base station hosting an edge V2X agent, the method comprising:
    the wireless base station receiving V2X service data individually associating a core V2X service with the core V2X agent hosted by the LTE network core and individually associating an edge V2X service with the edge V2X agent hosted by the wireless base station;
    the wireless base station wirelessly receiving user communication data identifying one of the V2X services from a vehicle User Equipment (UE);
    the wireless base station establishing and maintaining individual connections to the edge V2X agent hosted by the wireless base station and to the LTE network core;
    when the identified one of the V2X services is the edge V2X service, the wireless base station transferring the user communication data to the edge V2X agent hosted by the wireless base station using one of the established individual connections; and
    when the identified one of the V2X services is the core V2X service, the wireless base station transferring the user communication data for delivery to the core V2X agent hosted by the LTE network core using another one of the established individual connections.

2. The method of claim 1 wherein the identified one of the V2X services comprises a Vehicle-to-Vehicle (V2V) service.

3. The method of claim 1 wherein the identified one of the V2X services comprises a Vehicle-to-Pedestrian (V2P) service.

4. The method of claim 1 wherein the identified one of the V2X services comprises a Vehicle-to-Network (V2N) service.

5. The method of claim 1 wherein the identified one of the V2X services comprises a Vehicle-to-Infrastructure (V2I) service.

6. The method of claim 1 wherein the vehicle UE comprises an LTE-enabled motor vehicle.

7. The method of claim 1 wherein the wireless base station comprises an evolved Node B (eNodeB).

8. The method of claim 1 wherein the wireless base station receiving the user communication data identifying one of the V2X services from the vehicle UE comprises receiving a Radio Resource Connect (RRC) message that indicates the identified one of the V2X services.

9. A wireless base station in a Long Term Evolution (LTE) network that comprises an LTE network core that hosts a core Vehicle-to-X (V2X) agent, the wireless base station comprising:
    a wireless base station processing system configured to host an edge V2X agent;
    a wireless base station transceiver system configured to receive V2X service data individually associating a core V2X service with the core V2X agent hosted by the LTE network core and individually associating an edge V2X service with the edge V2X agent hosted by the wireless base station;
    the wireless base station transceiver system configured to wirelessly receive user communication data identifying one of the V2X services from a vehicle User Equipment (UE);
    the wireless base station processing system configured to direct the transceiver system to establish and maintain individual connections to the edge V2X agent hosted by the wireless base station and to the LTE network core;
    when the identified one of the V2X services is the edge V2X service, the wireless base station processing system configured to direct the transceiver system to transfer the user communication data to the edge V2X agent hosted by the wireless base station one of the established individual connections; and
    when the identified one of the V2X services is the core V2X service, the wireless base station processing system configured to direct the transceiver system to transfer the user communication data for delivery to the LTE network core another one of the established individual connections.

10. The wireless base station of claim 9 wherein the identified one of the V2X services comprises a Vehicle-to-Vehicle (V2V) service.

11. The wireless base station of claim 9 wherein the identified one of the V2X services comprises a Vehicle-to-Pedestrian (V2P) service.

12. The wireless base station of claim 9 wherein the identified one of the V2X services comprises a Vehicle-to-Network (V2N) service.

13. The wireless base station of claim 9 wherein the identified one of the V2X services comprises a Vehicle-to-Infrastructure (V2I) service.

14. The wireless base station of claim 9 wherein the vehicle UE comprises an LTE-enabled motor vehicle.

15. The wireless base station of claim 9 wherein the wireless base station comprises an evolved Node B (eNodeB).

16. The wireless base station of claim 9 wherein the wireless base station transceiver system is configured to receive a Radio Resource Connect (RRC) message that indicates the identified one of the V2X services.

* * * * *